United States Patent [19]
Pustelnik

[11] 3,925,989
[45] Dec. 16, 1975

[54] TURBOCHARGER EXHAUST GAS RECIRCULATION SYSTEM

[75] Inventor: Roy J. Pustelnik, Tinley Park, Ill.

[73] Assignee: J. I. Case Company, Racine, Wis.

[22] Filed: Apr. 15, 1974

[21] Appl. No.: 460,850

[52] U.S. Cl. ................. 60/602; 60/605; 123/119 A
[51] Int. Cl.² ......................................... F02D 23/00
[58] Field of Search ....... 123/119 A; 60/39.52, 598, 60/599, 600, 601, 602, 605, 606, 611, 614

[56] References Cited
UNITED STATES PATENTS

| | | | |
|---|---|---|---|
| 2,633,698 | 4/1953 | Nettel | 60/599 |
| 3,149,454 | 9/1964 | Hahn | 60/601 |
| 3,799,133 | 3/1974 | Frank | 123/119 A |

FOREIGN PATENTS OR APPLICATIONS

| | | | |
|---|---|---|---|
| 941,532 | 11/1963 | United Kingdom | 123/119 A |

*Primary Examiner*—Charles J. Myhre
*Assistant Examiner*—James D. Liles
*Attorney, Agent, or Firm*—Cullen, Settle, Sloman & Cantor

[57] ABSTRACT

A turbocharged internal combustion engine includes a bypass manifold interconnecting intake and exhaust manifolds for recycling exhaust gases back to the engine to reduce oxides of nitrogen. A compressor in the intake manifold is driven by a turbine in the exhaust manifold to pressurize intake air for the engine. The bypass manifold is connected to the intake manifold in a manner so that recycled exhaust gas does not flow through the compressor, to thereby eliminate undersireable exhaust contaminant build up in the compressor. The bypass manifold includes a one-way valve to prevent the pressurized intake manifold air from backflowing into the exhaust system during full load operation. A control system regulates the differential pressure between the intake and exhaust manifolds by monitoring engine operating parameters. When a predetermined pressure differential is established between the exhaust and intake manifolds, the bypass manifold valve opens to recycle exhaust gases.

1 Claim, 1 Drawing Figure

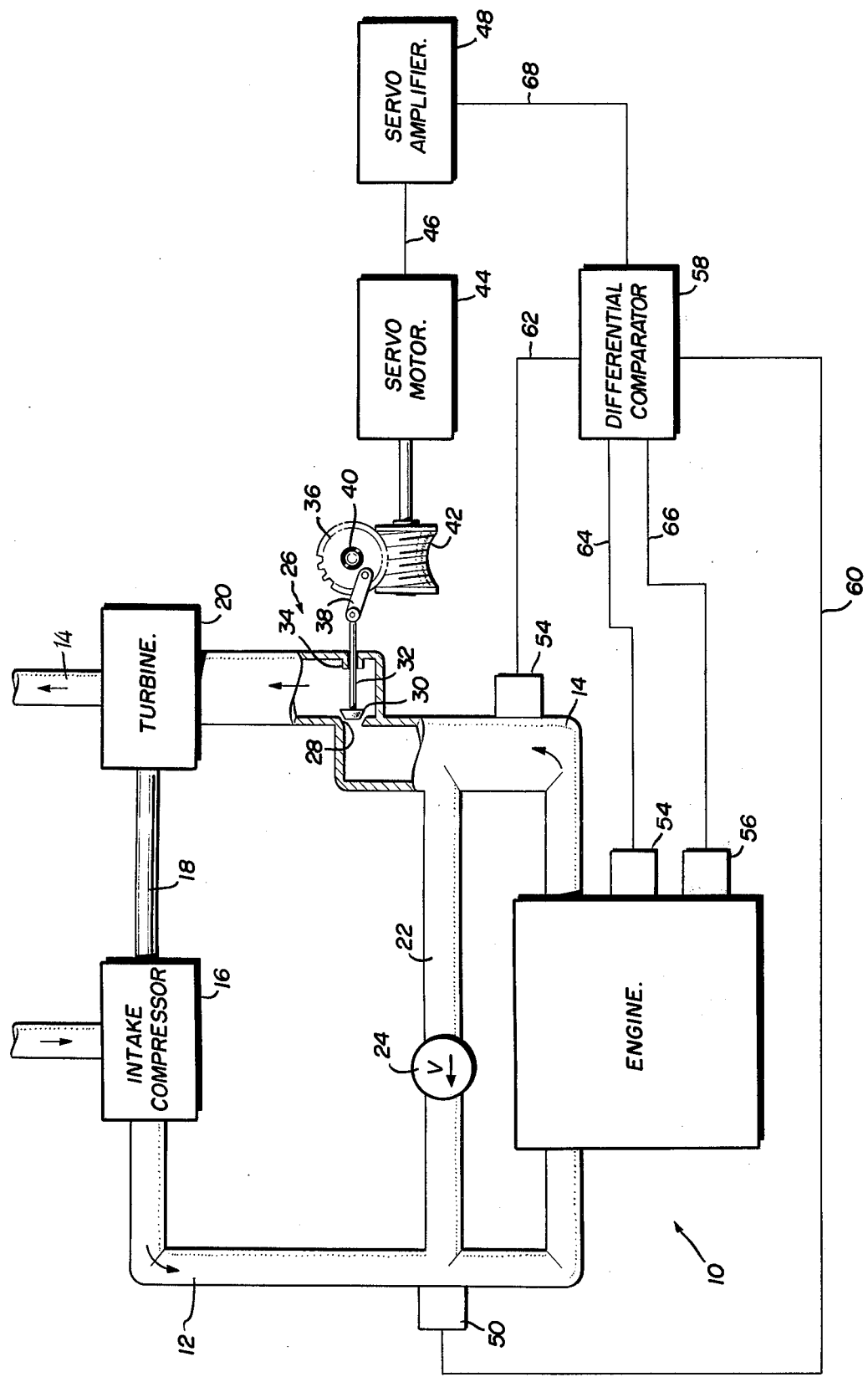

TURBOCHARGER EXHAUST GAS RECIRCULATION SYSTEM

BACKGROUND OF THE INVENTION

1. Field of the Invention

The present invention relates to internal combustion engines, and more particularly to internal combustion engines having an exhaust gas recirculation system for reducing oxides of nitrogen emissions.

2. The Prior Art

Prior art devices include bypass manifolds interconnecting intake and exhaust manifolds, as illustrated by U.S. Pat. No. 3,102,381. However, this patent discloses metering specific quantities of intake air to the exhaust manifold to attain proper engine operation, rather than recycling exhaust gases to reduce emissions of nitrogen oxide.

Other prior art patents disclose recycling portions of exhaust gas from the exhaust manifold to the intake manifold in order to reduce pollution. For example, U.S. Pat. No. 3,542,004 to Cornelius discloses a bypass manifold having a metering valve. The disclosed valve is responsive only to the engine throttle position and does not take into account other critical engine operating conditions. Other prior art patents, for example, U.S. Pat. Nos. 3,306,033 to Cornelius, 3,492,980 to Beck and 3,559,402 to Stone, disclose recirculating exhaust gases back to the engine intake. None of these patents, however, deal specifically with an engine having a pressurized intake manifold or an engine having a monitoring system to control the amount of exhaust gases recirculated.

Even in the specific environment of an engine having a compressor to pressurize intake air, exhaust gases have been recirculated to reduce pollutant emissions. In these prior art devices, the exhaust gases were recirculated in such a manner to flow back through the intake compressor. Carbon and other contaminants within the exhaust gases accumulate on the blades of the compressor, thereby resulting in a loss of performance and requiring costly maintenance for repairing malfunctions and cleaning the compressor blades.

Prior to the present invention, there was no satisfactory apparatus for recirculating exhaust gases of a turbocharged engine without fouling the components of the intake compressor nor for taking into account engine power output requirements for reducing oxides of nitrogen to a minimum without substantial losses of engine horsepower.

SUMMARY OF THE INVENTION

The present invention includes an internal combustion engine having an intake manifold and an exhaust manifold. Intake gases are pressurized in the intake manifold by a compressor which is driven by a turbine operated by exhaust gases within the exhaust manifold. A bypass manifold interconnects the intake and exhaust manifolds to selectively recycle exhaust gases back to the engine under proper engine operating conditions so that emissions of oxides of nitrogen will be reduced.

Because intake air is pressurized by the compressor, the pressure within the intake manifold is normally higher than the pressure within the exhaust manifold. Accordingly, a valve is positioned within the bypass manifold so that intake air cannot backflow through the exhaust system. In the preferred embodiment the bypass valve is spring biased one-way, thereby permitting gases from the exhaust manifold to be controllably recycled back to the intake manifold. In order to recycle exhaust gases back to the intake manifold, the pressure within the exhaust manifold must be greater than in the intake manifold. To accomplish this, a valve is arranged within the exhaust manifold, either ahead of or "downstream" from the turbine, and is controllably operated to regulate exhaust gas pressure. When the pressure difference between the exhaust and intake manifolds becomes great enough to overcome the biasing force on the one-way valve, exhaust gases flow through the opened valve into the intake manifold. By controlling the range of differential pressure, the amount of exhaust gases recirculated can be predetermined for optimum emissions of oxides of nitrogen for all speeds and loads of the engine.

Linear variable differential transducers are operably mounted within the system to measure intake gas pressure, exhaust gas pressure, engine piston reciprocation speed, and engine throttle position. Measurements from these linear variable differential transducers are fed into a differential comparator which is programmed according to the engine's performance characteristics to relay a signal to a servoamplifier and servomotor to operate the exhaust manifold valve to meter the amount of exhaust gases desired.

Recirculation of exhaust gases back into the intake manifold will take place only when the pressure differential between the exhaust and intake manifolds is great enough to overcome the spring biasing force in the bypass manifold valve. Pressure is increased within the exhaust manifold by restricting the flow of exhaust gases past the exhaust manifold valve. The position of the exhaust manifold valve is controlled by a programmed electrical system on the basis of engine operating characteristics and operating conditions. For example, when the engine is operated under a heavy loading condition, maximum output is required. In such circumstances, it is undesireable to recirculate exhaust gases so that maximum engine output horse power can be developed. Under most other operating conditions it would be desireable to recirculate exhaust gases to reduce emissions of oxides of nitrogen.

BRIEF DESCRIPTION OF THE DRAWING

The single drawing is a schematic representation of the internal combustion engine of the present invention having a recirculation system for exhaust gases.

DETAILED DESCRIPTION OF THE INVENTION

The drawing illustrates an internal combustion engine 10 having an intake manifold 12 and an exhaust manifold 14. The direction of intake air flow and exhaust gas flow through the system is indicated by the arrows. An intake compressor 16, which is a turbine in preferred embodiment, is located within the intake manifold for pressuring intake air before it enters the engine. The intake compressor is driven by a shaft 18 which is interconnected between the intake compressor 16 and a turbine 20 in the exhaust manifold 14. Exhaust gases flowing through manifold 14 drive turbine 20 to thereby drive the intake compressor by shaft 18.

The pollution control assembly for the previously described engine includes a bypass manifold 22. A one way valve 24 is located within the bypass manifold to selectively permit predetermined amounts of exhaust gases to be recycled back into the intake air. In the preferred embodiment the one-way bypass manifold valve is a conventional spring biased member openable at a preselected differential pressure between the exhaust manifold and intake manifold.

During most phases of conventional engine operation the pressure within the intake manifold is higher than the pressure in the exhaust manifold due to the operation of the intake compressor. Thus, to prevent intake air from bypassing the engine by way of manifold 22, valve 24 is constructed to permit flow only from exhaust manifold to the intake manifold. In order to induce exhaust gas flow through the bypass manifold into the intake manifold, the present invention provides a valve means 26 to controllably increase pressure within exhaust manifold 14 in accordance with the operating conditions of the engine. Valve 26 includes a valve seat 28 in manifold 14 and a valve head 30 rigidly connected to reciprocable shaft 32. Guide 34 includes a suitable sealing means (not shown) and assures that valve head 30 properly engages valve seat 28.

Although the exhaust manifold valve 26 has been illustrated as being located ahead of the turbine 20 within the exhaust manifold 14, it could also be located "downstream" from the turbine within the exhaust manifold. Further, the valve may be constructed otherwise than illustrated; for example, the exhaust manifold valve could include a diaphragm restricting means rather than the reciprocable shaft 32 and head 30.

The position of valve head 30 is regulated to properly resist passage of exhaust gases in order to regulate the pressure within the exhaust manifold 14. In the preferred embodiment the position of valve head 30 is regulated by a gear wheel 36 and a positioning link 38 pivotally connected between the gear wheel and valve shaft 32. Gear wheel 36 is rotatably mounted about pin 40, or other suitable means, and is rotatably driven by a worm gear 42. An electrical servomotor 44 drives the worm gear in accordance with electrical impulses transmitted along line 46 from a servoamplifier 48.

As mentioned previously, in order to properly recirculate or recycle exhaust gases from the exhaust manifold to the intake manifold it is necessary to monitor the pressures within these respective chambers. Further, recirculation of exhaust gases is dependent upon certain engine conditions such as load and engine piston r.p.m. These engine conditions can be determined by monitoring the engine speed, engine throttle position and manifold pressures. These four parameters, i.e., take and exhaust manifold pressures, engine speed, and engine throttle position, are measured by linear variable differential transducers indicated, respectively, by reference numerals 50, 52, 54 and 56. Linear variable differential transducers are well known in the art for their accuracy in sensing and transmitting signals. Suitable transducers for purposes of the present invention are manufactured and sold by Trans-Tech, Inc.

Output signals from the four linear variable differential transducers are transmitted to a differential comparator 58, which is conventional within the art. For example, pressure within intake manifold 12 is measured by transducer 50 which sends an appropriate signal along line 60 to the differential comparator. In a like manner, transducer 54 measures the pressure within exhaust manifold 14 and transmits an appropriate signal along line 62. Transducer 54 measures engine speed and transmits an appropriate signal along line 64, while transducer 56 measures the engine throttle position and transmits an appropriate signal along line 66.

Differential comparator 58 is programmed according to the performance characteristics of the particular type engine being utilized. The conditions measured by the linear variable differential transducers are compared against the programmed characteristics of the engine and an electrical command signal is transmitted along line 68 to servoamplifier 48 on the basis of the measurements and comparisons. As a result, the servoamplifier operates servomotor 44 to properly position valve head 30 in relation to valve seat 28. The desired pressure within exhaust manifold 14 is thereby generated as previously described.

Experimental testing has proved that the recirculation of exhaust gases reduces oxides of nitrogen in exhaust emissions. It is believed that this reduction in emissions is caused by a corresponding reduction of oxygen within the engine chambers which can unite with the nitrogen to form the oxides of nitrogen. It is believed that a further reason for a reduction of emissions is due to a reduced rate of burning within the engine chambers to thereby reduce combustion pressure and temperature. However, any recirculation of exhaust gases should be based upon the particular engine operating conditions, for example power output requirements, and engine efficiency characteristics.

For example, under heavy engine loading conditions it will be desirable to recirculate very little, if any, exhaust gases. The engine loading condition can be determined by comparing the engine r.p.m. and throttle position. When a heavy engine load condition occurs, the differential comparator will regulate the exhaust manifold valve to a position for conventional engine exhaust operation.

If engine operating conditions indicate that exhaust gases should be recirculated, valve head 30 is positioned near valve seat 28 to increase the pressure within the exhaust manifold so that the closing force of valve 24 within the bypass manifold is overcome. When this happens, exhaust gases recirculate through the bypass manifold into the intake manifold and engine to thereby reduce emissions of nitrogen oxide.

It is to be understood that the previously described embodiment is merely exemplary of the invention and is not intended to be limiting in any way. For example, the exhaust manifold valve could be located in the exhaust gas flow path "down stream" from the turbine as set forth previously.

Having fully and completely described my invention, I claim:

1. An exhaust gas recirculation system for reducing emissions of oxides of nitrogen from an internal combustion engine, including:

an intake manifold and an exhaust manifold;

a turbine in said exhaust manifold driven by exhaust gases from said engine, and an intake compressor in said intake manifold, said turbine being drivingly interconnected with said intake compressor for pressurizing intake gases before entering the engine;

a bypass manifold interconnected between said intake and exhaust manifolds to accommodate the recirculation of exhaust gases from the exhaust manifold into the intake manifold for selectively reducing emissions of oxides of nitrogen from the engine, said bypass manifold being connected to the intake manifold between the intake compressor and the engine to eliminate exhaust contaminant build-up in the compressor;

one-way valve means in the bypass manifold (a) preventing pressurized air within said intake manifold from flowing through the bypass manifold into the exhaust manifold, and (b) openable at a predetermined pressure differential between the exhaust and intake manifolds to recirculate exhaust gases into the pressurized intake air;

adjustable valve means in the exhaust manifold for selectively restricting exhaust gas flow from the engine in order to selectively recirculate exhaust gases from the exhaust manifold through the biasing valve means in the bypass manifold to the intake manifold;

control means for regulating the adjustable valve means to selectively recirculate exhaust gases, said control means including (a) linear variable differential transducers monitoring engine speed, engine throttle, intake manifold pressure, and exhaust manifold pressure, (b) a differential comparator interconnected with each of the linear variable differential transducers for receiving information output signals therefrom, said differential comparator being preprogrammed in accordance with the performance characteristics of the engine for generating electrical command signals, (c) a servoamplifier interconnected with said differential comparator for receiving the electrical command signals, and (d) a servomotor interconnected with both said servoamplifier and said adjustable valve means for regulating the position of the valve in response to the electrical command signal.

* * * * *